United States Patent [19]

Watson et al.

[11] Patent Number: 4,747,589
[45] Date of Patent: May 31, 1988

[54] UNIVERSAL PNEUMATIC PARTS LOCATING SYSTEM

[75] Inventors: Donald R. Watson, Kingston; Kevin L. Woolbright, Rochelle; Russell L. Schreiner, Norridge, all of Ill.

[73] Assignee: GTE Communication Systems Corporation, Phoenix, Ariz.

[21] Appl. No.: 50,120

[22] Filed: May 15, 1987

[51] Int. Cl.[4] ............................................. B25B 11/00
[52] U.S. Cl. ......................................................... 269/21
[58] Field of Search .................. 269/20, 21, 303, 315; 51/235; 279/3 R; 248/36 C, 363; 101/382 MV; 294/64 R, 64 A, 64 B; 118/500; 414/676; 406/87, 88

[56] References Cited

U.S. PATENT DOCUMENTS

| | | | |
|---|---|---|---|
| 2,317,348 | 4/1943 | Wekeman | 269/21 |
| 2,694,894 | 10/1972 | Jelinek et al. | 269/21 |
| 3,652,075 | 3/1972 | Thompson | 269/21 |
| 4,131,267 | 12/1978 | Ono et al. | 269/21 |
| 4,139,051 | 2/1979 | Jones et al. | 269/21 |
| 4,190,240 | 2/1980 | Peterson | 269/21 |
| 4,298,307 | 11/1981 | Bergman | 269/20 |
| 4,468,017 | 8/1984 | Pavone | 269/21 |

FOREIGN PATENT DOCUMENTS 58-51048  3/1983  Japan .................................. 269/303

*Primary Examiner*—Robert C. Watson
*Attorney, Agent, or Firm*—Gregory G. Hendricks

[57] ABSTRACT

A printer table including a series of angled jets for sources of air and for sources of vacuum and also including a set of locating pins. The combination enables the use of the directed jets to move a substrate into position for processing and to hold the substrate in position once located by the locating pins with the use of a vacuum. Because the substrates are very thin and the locating pins are very short, the combined use of the vacuum and directing jets effectively permit the substrate to float on air in close proximity to the table surface while not overriding the locating pins.

10 Claims, 3 Drawing Sheets

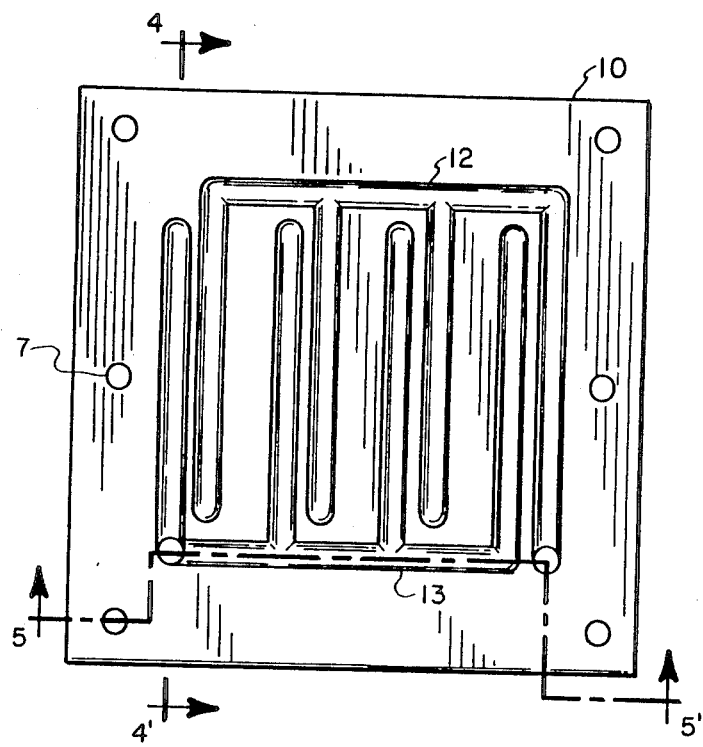
FIG. 3
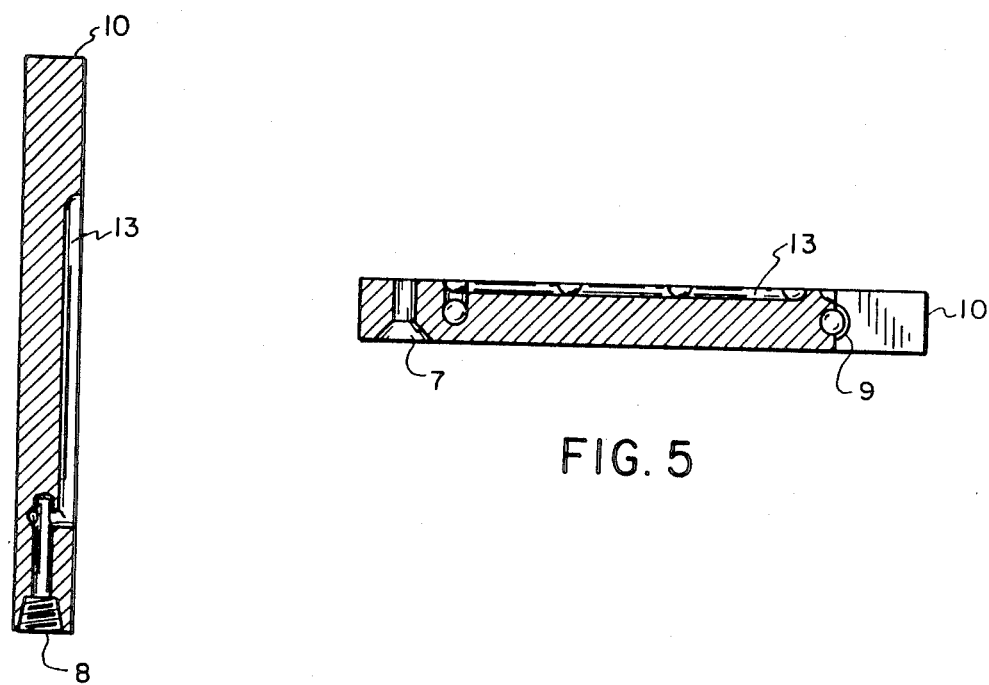
FIG. 4
FIG. 5

UNIVERSAL PNEUMATIC PARTS LOCATING SYSTEM

BACKGROUND OF THE INVENTION

1. Field of the Invention

The present invention is directed to the mechanical locating of circuit substrates during the manufacturing process; and more particularly to a work or printer table arrangement for use in locating alumina substrates for air laser scribing during thick film circuit pattern printing.

2. Background Art

In previous arrangements, substrates were typically pushed manually against the locating pins of the printer table and then fixed in position by a vacuum actuated by an operator's footswitch. This particular method was slow and inconsistent in alignment as well as inconsistent in loading force often resulting in damage to the substrates.

Upon automation of the thick film printers, the substrates were positioned by a mechanical locating mechanism. The mechanism in one particular example consisted of six spring-loaded linkages driven by a linear cam with a vacuum, actuated by a limit switch fixing the substrate position after locating was complete.

In this particular system, four major problems developed. The first of these was positioning and timing of the linkages which was difficult and time consuming; second, the linkages would often wear out over time requiring replacement; third, the linkages had to be adjusted each time the substrate thickness or pattern orientation was changed; and fourth, the system could only handle rectangular substrates within a plus or minus one percent size specification.

Another variation of this system utilized air cylinders and limit switches to actuate the linkages instead of springs and cams. The system decreased the number of required linkages but was rough on the substrates, often causing damage. Also, as with the previously outlined system, it required adjustment depending on the substrate thicknesses and pattern orientation and could not be used for oddly-sized or shaped parts.

In addition, due to the space requirements of both these systems, they were only applicable to the printing machinery and could not be utilized in laser scribing and laser trimming operations. These functions remained manual operations.

SUMMARY OF THE INVENTION

In the process of printing thick film circuits on thin alumina substrates, consistent and repeatable substrate location is of primary importance. Registration of plus or minus 0.001 inch must be maintained during possibly fifteen different operations on fifteen different machines and on both sides of the substrate. A pattern of three locating pins is repeated on all machinery for this purpose.

For automation purposes, placement of substrates against the locating pins had to be done without manual labor. In the past, mechanical devices such as linkages and air cylinders were used with varying success. Typical problems encountered were mechanical wear, alignment loss, inconsistent location and inflexibility.

To improve on current "moving parts" methods of substrate locating, it was decided that the parts should be moved by directional air to simulate a frictionless surface similar to that used on an air hockey table. Properly aimed air jets would float a substrate against the pins and hold it there as long as the table surface was level and stationery to eliminate additional forces. The system was not susceptible to external forces such as gravity due to the virtually frictionless surface provided over which the chips could be moved.

The most difficult application for the air jet system is in the printing process. The printing process is difficult because the requirement that the locating pins remain below the surface of a 0.025 inch thick substrate. The method had to be established to maintain a minimum air gap so that the parts would not float over the very short locating pins. It was soon discovered that air sufficient to move the substrates could overcome the vacuum used to fix substrate location during the actual printing cycle. By allowing the vacuum to stay on during locating concurrently with the air jets, a gap of 0.010 inch was achieved. The vacuum had the added advantage of lessening the bouncing of the substrates against the pins.

The successful use of the air jet locating system has solved many of the major problems inherent to the mechanical and manual techniques previously found. Since the air system has no moving parts to wear out, replace or realign, most maintenance requirements are thus eliminated. The air arrangement works faster than previous methods and puts virtually no compression forces onto the substrate, therefore eliminating the breaking or cracking of the brittle alumina.

The greatest improvement, however, is provided in the flexibility of the air locating system. With the mechanical system, snugger pins as well as the locating pins which contacted the substrate had to be raised and lowered for changing substrate thicknesses. An entire linkage are had to be moved when the printed surface changed from the front to the back of the substrate. If a differently shaped precise substrate was used, the mechanical system was of no use and manual loading had to be used to replace it.

With the present air jet system, the same height pins can be used for both 0.025 inch and 0.035 inch thick substrates since the air gap remains under 0.010 inch. The low number of air holes and air pressure required allow tooling to be oriented to the left or right at the turn of a valve and thus, it is possible to handle the rectangular-shaped substrates within a plus or minus fifteen percent tolerance. The substrates do not have to be rectangular as long as there are three flat surfaces to contact the locating pins.

The elimination of moving parts and associated hardware also allows the air jet system to be used in laser scribing and laser trimming operations as well as in the printing process.

DESCRIPTION OF THE DRAWINGS

FIG. 3 is a bottom view of the pneumatic parts locating system portion of a printer table in accordance with the present invention.

FIG. 4 is a sectional view of the pneumatic parts locating system taken along section lines 4—4 of FIG. 3.

FIG. 5 is a sectional view of the present invention taken along section lines 5—5 of FIG. 3.

DESCRIPTION OF THE PREFERRED EMBODIMENT

Figure 1:
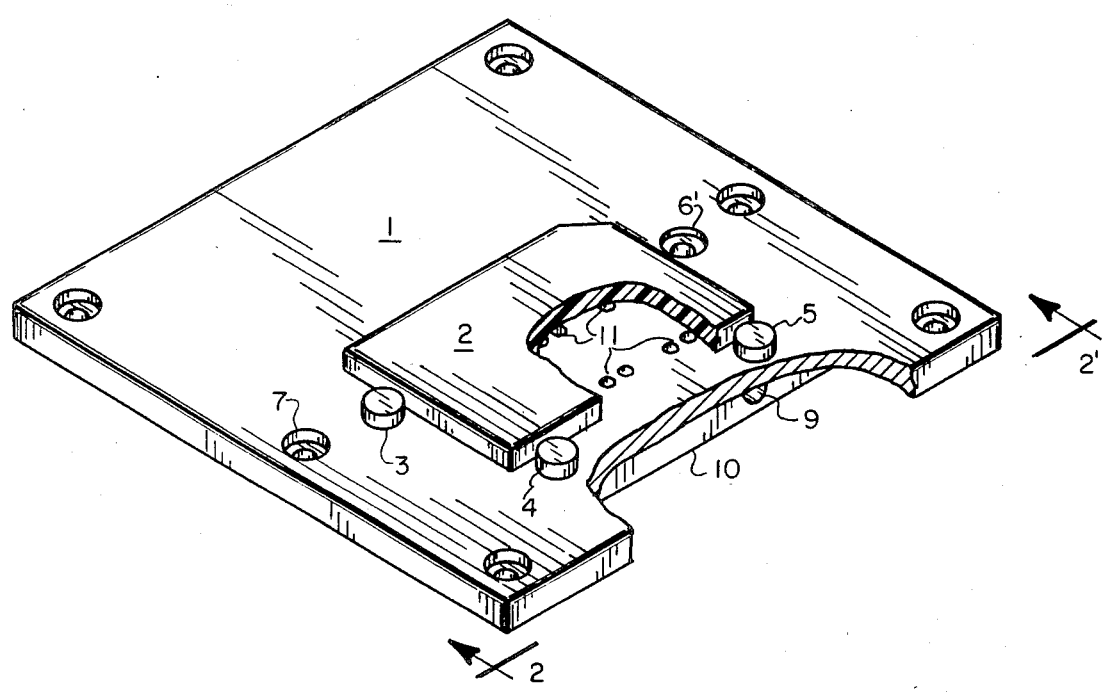
FIG. 1 is a partially sectionalized perspective view of a universal pneumatic parts locating system for a printer table in accordance with the present invention.
Figure 2:
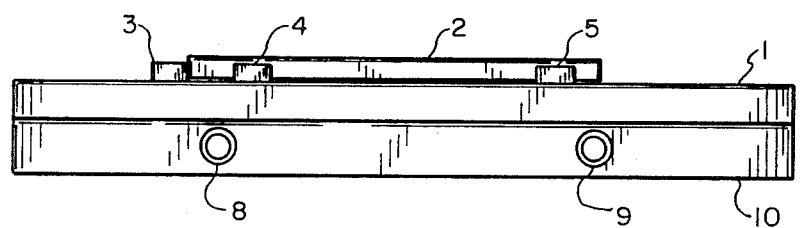
FIG. 2 is a side view of the pneumatic parts locating system of the present invention taken along section lines 2—2 of FIG. 1.

Referring now to FIG. 1, a printer table embodying the pneumatic parts locating system of the present invention is shown partially cut away. The upper table 1 shows in position thereon a substrate 2 in position against locating pins 3, 4 and 5. Should the orientation be for a right positioning rather than a left positioning, a locating pin would be positioned in opening 6' instead of including locating pin 3, at which point contact would be made to the locating pins 4, 5 and locating pin 6 which would be in the opening 6'. Positioned through the table are a number of openings 11 through which air jets and/or vacuum are made available for utilization in the present system. It can be readily seen that compressed air coming out of some of the holes 11 acts as a cushion facilitating the moving of the substrate into location against the locating pins (such as 3, 4, 5, etc.). At the same time, a vacuum through other holes helps to retain the substrate in close proximity to the top of printer table section 1. Located underneath the upper table portion 1 is lower section 10 which includes connections 8 and 9 (see FIG. 2) to air and/or vacuum sources. Locating pins 3, 4 and 5 are also shown in location on upper portion 1 and retaining substrate 2 in the appropriate location for left orientation.

Referring now to FIG. 3, channels 12 and 13 are shown which meld into the surface of the lower portion of the printer table 10 and which, as may be seen by reference to sectional views of FIGS. 4 and 5, are connected, with the channel 12 being connected to air source connection 9 and channel 13 being connected to vacuum source connection 8.

If the orientation of the substrate is to be to the left, compressed air will be introduced through connection 8 to channel 13 with vacuum then connected through opening 9 to channel 12. If the orientation for substrate location is to be the reverse, that is to the right with locating pins being in positions 4, 5 and 6', then it will be arranged with compressed air applied to connection 9 with vacuum at location 8.

Figure 6:
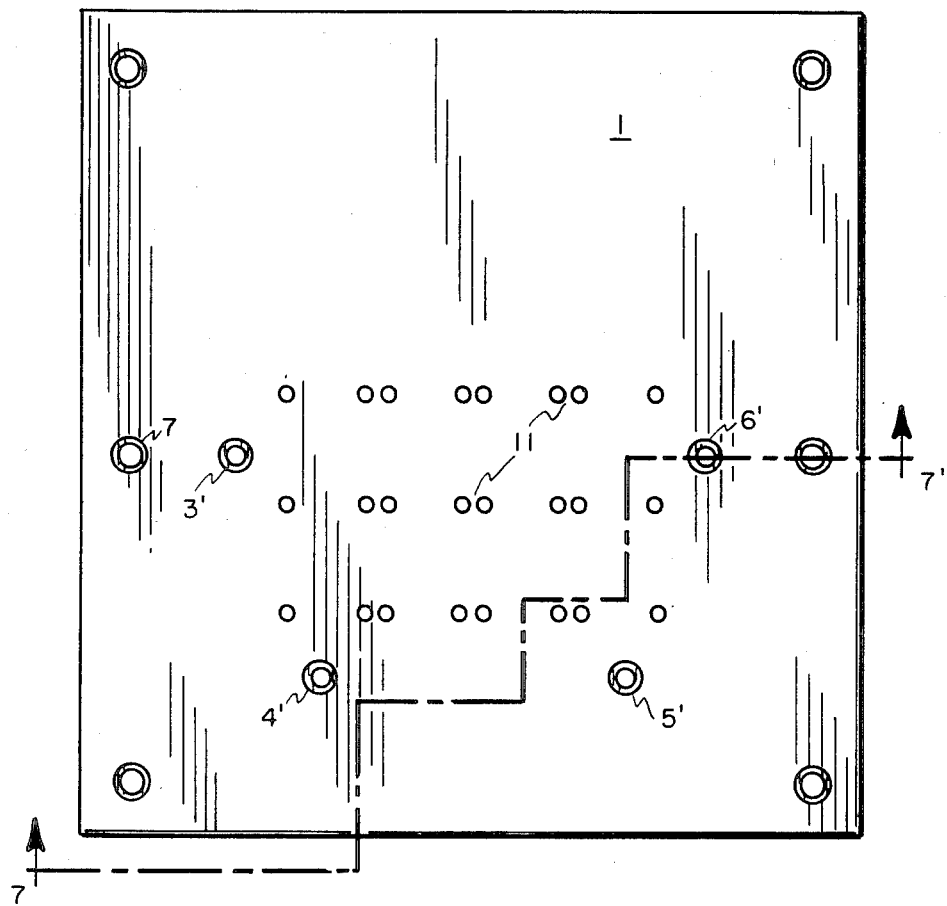
FIG. 6 is a top view of the table portion of the universal pneumatic parts locating system in accordance with the present invention.
Figure 7:
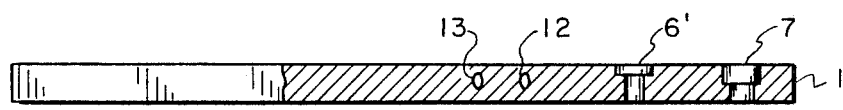
FIG. 7 is a sectional view of the printer table and locating sysytem in accordance with the present invention taken along section lines 7—7 of FIG. 6.

Referring to FIG. 6, the multiplicity of openings 11 which are connected to the channels 12 and 13 are evident as are the pin locating openings 3', 4', 5' and 6', as well as the locations for the fasteners or bolts through opening 7 which provide connection between the upper and lower portions of the printer table. Reference is made briefly to sectional view of FIG. 7, wherein the opening 6' for pin locator 6 (not shown) and opening 7 for the fastener by which the upper and lower portions are connected are shown.

As noted previously, the arrangement in accordance with the present invention provides two different three-pin locating layouts by means of a four-pin locating arrangement. As anticipated in the present invention, both bottom pins are used on all operations, while which of the two side pins 3 or 6 are utilized would depend on which side of the substrate is being processed.

In the present arrangement, the compressed air required for moving the substrate is brought underneath the part from a source through channels which meld into the bottom portion 10 and connected to the top portion 1 by bolts and sealed by gasket material. The block or bottom portion 10 contains two channels 12 and 13, one for moving the part to the lower left and one for moving the part to the lower right. That passage not used for location serves as the vacuum channel for securing the substrate in position once properly located. The compressed air comes up from the bottom portion 10, channels 12 or 13, underneath the substrate to angle holes 11 drilled between the top and bottom surfaces of the top planar portion 1.

During a print cycle using the air jet tooling in accordance with the present invention, a substrate 2 is dropped onto the tooling nest formed by the four-pin area by an automatic loader normally with a plus or minus 0.125 inch accuracy. The air and vacuum are both on as the substrate lands in the nest area. Upon contact with the upper portion 1, the air jets float the substrate 2 against the locating pins and hold it there. The table is then moved by a pneumatic piston toward the printing location while the air jets 11 hold the part 2 against the pins, such as 3, 4 and 5. During table motion and prior to arrival at the printing station, a limit switch (not shown) is encountered which closes the air valve allowing the vacuum to secure the part in position for printing.

After printing is completed, the table of the present invention begins to be cycled back to the original loading station. While the table is in motion, a second limit switch (not shown) closes the vacuum valve and activates a rake-off mechanism which clears the freshly printed substrate from the tooling nest. Finally, when the table reaches the original loading position, another limit switch (not shown) opens the air and vacuum valves and another substrate is dropped onto the tooling nest portion of the upper plate 1.

On those thick film printers presently available, substrate locating is done either by methods described in the background art section of this application or by optically driven mechanisms. In optically driven mechanisms, the substrate is placed and immediately secured on the tooling nest. An optical system then senses the current substrate orientation in relation to the desired orientation. A microprocessor in conjunction with the optical system then activates several motors to reorient the entire tooling nest to the proper location, providing much more complex arrangement than that shown in the present invention, where simplification is secured by means of the aforementioned mechanisms as outlined.

While but a single embodiment of the present invention is shown, it will be obvious to those skilled in the art that numerous modifications may be made without departing from the spirit of the invention which shall be limited only by the scope of the claims appended hereto.

What is claimed is:

1. A printer table for use in thick film printing of circuits on alumina substrates, said table comprising:
   a first planar section, including a top surface, a bottom surface, a first plurality of holes, each extending from said bottom surface to said top surface, a second plurality of holes, each extending from said bottom surface to said top surface;
   a plurality of sockets included in said top surface, each adapted to receive a locator pin;
   a second planar section, including a top surface, a bottom surface, first and second multielement channels located in said second planar section top surface;

first connecting means included in said second planar section connected to said first channel, adapted to facilitate connection to a source of compressed air;

second connecting means included in said second planar section connected to said second channel, adapted to facilitate connection to a vacuum source; and a plurality of fastening means adapted to connect said first section to said second section with said first section bottom surface abutting said second section top surface;

said first channel providing a first airway between said first connecting means and said first plurality of holes and said second channel providing a second airway between said second connecting means and said second plurality of holes;

whereby response to the connection of said first connecting means to a source of compressed air and said second connecting means to a vacuum source, the combined use compressed air directed through said first plurality of holes and said vacuum through said second plurality of holes permits said substrates to float on air in close proximity to said first planar section top surface while not overriding said locator pins in said sockets included in said top surface.

2. A printer table as claimed in claim 1, wherein:
said first plurality of holes are angularly drilled between said first planar section top surface and said bottom surface.

3. A printer table as claimed in claim 1, wherein:
said second plurality of holes are drilled angularly between said first planar section top surface and said bottom surface.

4. A printer table as claimed in claim 1, wherein:
said first and second plurality of holes are both angularly drilled between said first section top surface and said first section bottom surface.

5. A printer table as claimed in claim 1, wherein:
a plurality of locator pins are positioned in a portion of said sockets.

6. A printer table as claimed in claim 1, wherein:
said plurality of sockets includes a first, a second, a third and a fourth locator pin socket.

7. A printer table as claimed in claim 6, wherein:
locator pins are positioned in said first, second and third locator sockets to facilitate placement of substrates in a left orientation.

8. A printer table as claimed in claim 6, wherein:
locator pins are positioned in said second, third and fourth locator sockets to facilitate right orientation placement of said alumina substrates.

9. A printer table as claimed in claim 1, wherein:
said first multielement channel comprises a plurality of parallel-located distributing channels and a feeder channel perpendicular to said distributing channels and connected to each of said distributing channels, said feeder channel further including a connection to said first connecting means.

10. A printer table as claimed in claim 1, wherein:
said second multielement channel comprises a plurality of parallel-located distributing channels and a feeder channel perpendicular to said distributing channels and connected to each of said distributing channels; and one of said distributing channels including a connection to said second connecting means.

* * * * *